UNITED STATES PATENT OFFICE.

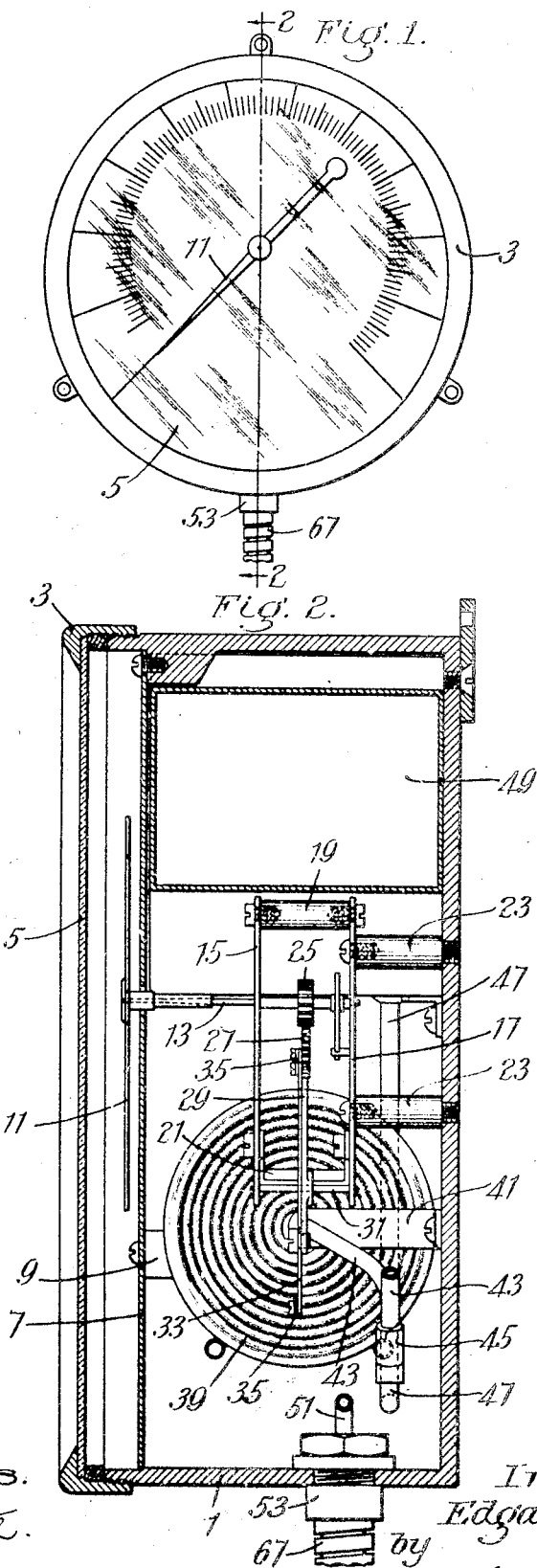

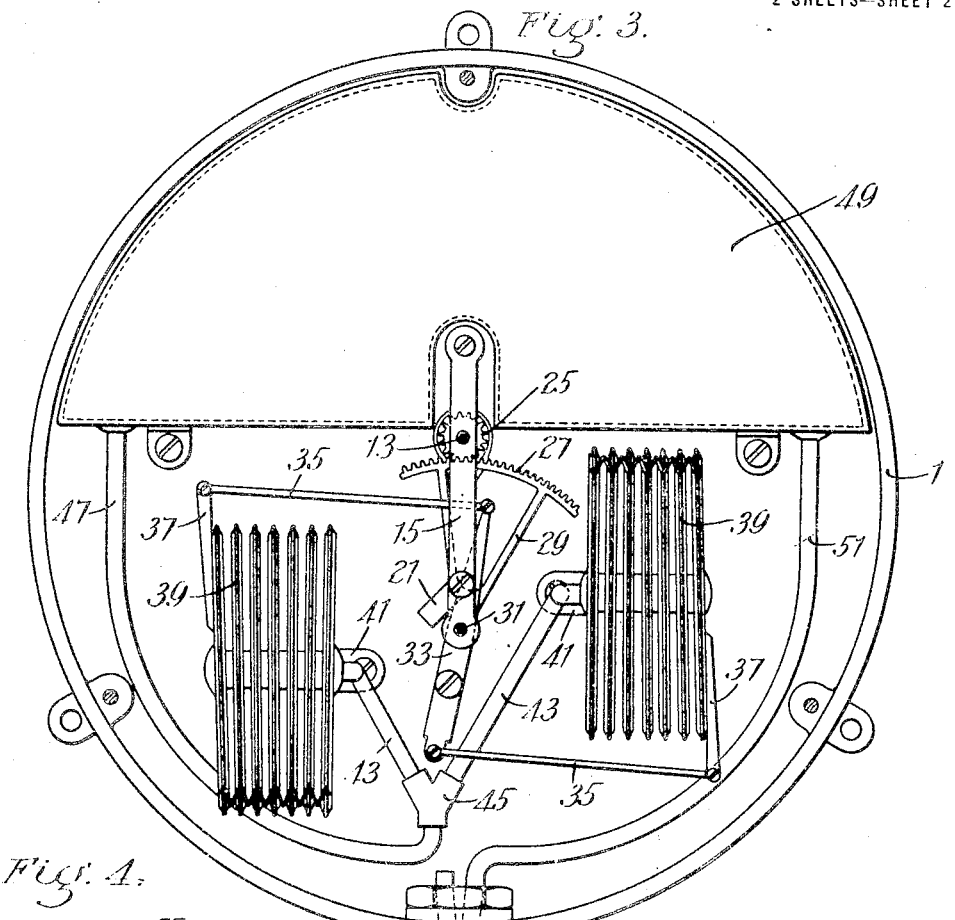

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

SPEEDOMETER.

1,240,790.  Specification of Letters Patent.  Patented Sept. 18, 1917.

Application filed March 17, 1915. Serial No. 15,059.

*To all whom it may concern:*

Be it known that I, EDGAR H. BRISTOL, a citizen of the United States, and a resident of Foxboro, Massachusetts, have invented an Improvement in Speedometers, of which the following description, in connection with the accompanying drawings, is a specification, like characters on the drawings representing like parts.

This invention relates to speedometers and among other objects aims to provide a simple and effective mechanism for accurately indicating the speed of aeroplanes and other devices, irrespective of the position thereof.

The character of the invention can be best understood by reference to the following description of an illustrative embodiment thereof shown in the accompanying drawings, wherein:

Figure 1 is a front elevation of an illustrative speedometer shown herein as embodying the invention.

Fig. 2 on an enlarged scale is a vertical section taken on line 2—2 of Fig. 1.

Fig. 3 is a front elevation of the device shown in Fig. 2 with the covering of the casing and the dial plate removed to disclose the mechanism contained therein; and Fig. 4 is a section taken on line 4—4 of Fig. 3.

Referring to the drawings, the illustrative speedometer there shown comprises a casing having a cylindrical body 1 and a cover 3 screwed thereto provided with a glass 5. Back of the glass is a dial plate 7 set in a counterbore in the casing and secured in place by screws threaded into posts 9 projecting outward from the back of the casing. The dial plate is provided with a series of graduations (1) which may be marked to indicate different speeds. Co-operating with these graduations is an index hand 11 fast on the end of a shaft 13 projecting through an apperture in said plate and journaled in bearings in bars 15 and 17 held in spaced relation by posts 19 and 21. The rear bar 17 is mounted on posts 23 threaded to rear wall of the casing.

To turn the index hand 11 the shaft 13 is provided with a pinion 25 fast thereon meshing with an arcuate rack 27 on a lever 29 fastened intermediate its ends on a shaft 31 journaled in bearings in ends of the bars 15 and 17 projecting somewhat beyond the post 21.

To rotate the shaft 31 a lever 33 is mounted fast thereon, substantially midway between the ends of said lever, said ends being connected by links 35 with arms 37 fast on movable ends of hollow expansion tubes 39 having fixed ends mounted on brackets 41 secured to the rear wall of the casing.

The difference in the pressure within and without the tubes 39 will cause the same to expand and contract, and in so doing they will shift the links 35 and rock the levers 33 and 29 and cause the index shaft and index to rotate.

Next will be described the construction for producing the expansion or contraction of said tubes. To accomplish this they are connected by branch pipes 43 (Fig. 3) with a union 45 connected in turn by a pipe 47 with a chamber 49. This chamber is connected to one end of a pipe 51 which passes through a neck 53 out of the casing to a Pitot tube more fully hereinafter described.

A pipe 55 is provided having an end communicating with the interior of the casing, said pipe being led out of said casing through the neck 53 to said Pitot tube. The volume of the air within the casing surrounding the instrumentalities contained therein is equal to the total volume of the two expansion tubes 39 and the chamber 49, thereby balancing the static pressures within and without said expansion tubes due to the air contained in the apparatus.

An important feature of the invention relates to the construction of the Pitot tube which comprises a cylindrical wall 57 fast on the end of a conical wall 59 projecting from an elongated neck 61 containing the pipes 51 and 53. Within the cylindrical wall 57 is a conical wall 63 presenting its apex centrally within said cylindrical wall. A deflecting wall 65 projects rearwardly from the front end of the cylindrical wall 57 and flares outwardly.

The pipe 51 is introduced into the conical wall 63 and terminates a short distance from the inner surface thereof. The pipe 55 projects through a hole in the wall of the neck 61 thence along the conical wall 59 and is entered into the space formed between the cylindrical wall 57 and the upwardly flaring wall 65, said pipe terminating a short distance from the inner surface of the latter wall.

To protect the pipes 53 and 55 they may be incased in flexible metallic tubing 67 connected to one end with the casing neck 53 and at its opposite end by a coupling 69 with the Pitot tube neck 61.

When the front end of the Pitot tube is presented to the wind the air will flow into the space between the conical and cylindrical walls 63 and 57 and be compressed into the chamber formed by the conical wall 59. The compression thus created is transmitted through the pipe 51 into the chamber 49, thence through the pipe 47 and branch pipes 43 into the expansion tubes 39, thereby tending to expand said tubes. At the same time that the compression occurs in the pipe 51, the sweep of the air along the outer surface of the rearwardly flaring wall 65 tends to create a vacuum in the space between said flaring wall and the cylindrical wall 57. This vacuum tendency is transmitted through the pipe 55 to the interior of the casing.

The compression within and rarification without the tubes 39 produces movement of their free ends, said movement being transmitted by the arms 37 and links 35 to the lever 33. Said lever in turn rotates the shaft 31 and the lever 29 carrying the arcuate rack 27. The latter imparts rotation to the pinion 25 and its shaft and the index hand mounted on the latter causing said hand to swing over the dial plate more or less depending on the differential pressure produced.

An important feature of the invention relates to the balanced arrangement of the operating mechanism for the index. It will be observed that one of the expansion tubes 39 is located on one side of the fulcrum of the rack operating lever, while the other expansion tube is located on the opposite side of said fulcrum. Also said tubes are of equal size, their links 35 are of equal length and weight and are connected to the lever 33 at equal distances from the fulcrum thereof but at opposite sides of said fulcrum.

If, for example, the aeroplane carrying the instrument tilts so as to throw the instrument out of a truly vertical position, the movable heads of the tubes will be thrown out of vertical planes. Consequently, gravity acting thereon will tend to move said heads relatively to the fixed heads which are secured to the brackets 41. However, since said movable heads are connected to the lever 33 at opposite sides of its fulcrum, the tendency of one of the expansion tubes to rotate said lever in one direction will be counterbalanced or opposed by the tendency of the other expansion tube to rotate said lever in an opposite direction. This counter-balancing effect of the two expansion tubes will maintain for all of the positions of the instrument. As a result, the index will be rotated merely in response to such expansion and contraction of the tubes as is produced by the differential pressures in the Pitot tube as described; and the instrument can be relied upon to indicate accurately the various speeds of the aeroplane on which it is mounted.

The construction of the Pitot tube is advantageous, not only because it is effective for creating the differential pressure, but also because it prevents the ingress of moisture into the tubes 51 and 55 connected thereto. This is due to the cap protection of the cone 63 over the end of the duct 51 and the cap protection afforded by the deflecting wall 65 over the end of the duct 55. The presence of moisture or accumulated water in the ducts leading to the Pitot tube would of course destroy the accuracy of the instrument.

While the instrument is described herein more particularly with reference to its application to an aeroplane, it will be understood that its field of use is not restricted thereto.

Having described one illustrative embodiment of the invention without limiting the same thereto, what I claim as new and desire to secure by Letters Patent, is:

1. An instrument of the class described comprising an index and means to actuate said index including pressure-responsive tubes and means to transmit movement from said tubes to said index, said tubes and transmission means being balanced against movement by gravity in all positions of the instrument.

2. An instrument of the class described comprising an index 11, and means to actuate said index including pressure-responsive tubes 39, 39, balanced for preventing movement of said index by gravity in all positions of the instrument.

3. A speedometer comprising in combination, a casing, an index, a Pitot tube, expansion tubes mounted in said casing, pipe means connecting said Pitot tube with the interiors of said expansion tubes, pipe means connecting said Pitot tube with the interior of said casing, and means for transmitting movement from said expansion tubes to said index, said expansion tubes being arranged to counter-balance the effect of gravity thereon.

4. A speedometer comprising in combination, an index shaft, a pinion thereon, a rack meshing with said pinion, a shaft for said rack, a lever on said shaft, pressure responsive expansion tubes and links connecting the opposite ends of said lever with said tubes.

5. A speedometer comprising in combination, an index and means for rotating same including a shaft, a lever fulcrumed to said shaft intermediate its ends, pressure responsive expansion tubes symmetrically located at opposite sides of said fulcrum and members connecting said tubes with said lever.

6. A speedometer comprising in combination, an index and means for rotating the same including a shaft, rack and pinion means actuated thereby, a lever mounted intermediate its ends on said shaft, pressure responsive expansion tubes located at opposite sides of said shaft, and members connecting said expansion tubes with said lever.

7. A speedometer comprising in combination, an index and means for imparting movement thereto including a shaft, a lever thereon, expansion tubes located on opposite sides of said shaft having fixed and movable heads and members connecting said movable heads with said lever.

8. A speedometer comprising in combination, an index, a casing, and means for imparting movement to said index including expansion tubes and a chamber having a total volume substantially equal to the volume of the space in the casing.

9. A speedometer comprising in combination, an index and means for moving said index having provision for preventing gravity from influencing the movement of said index.

10. In a speedometer, the combination of an index with governing means therefor, ducts, a Pitot tube, having portions formed for creating a differential pressure in said ducts and having provision for preventing the ingress of moisture into said ducts.

11. In a speedometer, the combination of an index with governing means therefor including a Pitot tube comprising outer and inner conelike members, and ducts entered into said members.

12. In a speedometer, the combination of an index with governing means therefor including a Pitot tube comprising a cylindrical wall, a deflecting wall secured to the forward end of said cylindrical wall and flaring rearwardly therefrom, a duct having an open end between said walls, a cone located centrally within said cylindrical wall and a duct having an open end in said cone.

13. In a speedometer, the combination of an index with governing means therefor including a Pitot tube comprising a hollow annular member and a hollow member within said annular member, both of said members having closed front ends and open rear ends, and ducts communicating with said members.

14. In a speedometer, the combination of an index with governing means therefor comprising hollow members having means for creating differential pressure in said governing means and means for preventing ingress of moisture to said governing means.

In testimony whereof, I have signed my name to this specification, in the presence of two subscribing witnesses.

EDGAR H. BRISTOL.

Witnesses:
GEORGE A. WROE,
L. L. JORDAN.